United States Patent [19]
Matsumoto et al.

[11] Patent Number: 5,879,569
[45] Date of Patent: Mar. 9, 1999

[54] MAGNETIC DISK AND METHOD OF AND APPARATUS FOR MANUFACTURING MAGNETIC DISK

[75] Inventors: Hiroshi Matsumoto; Hiroshi Yashiki; Yoichi Inomata, all of Odawara; Tatsuya Yoneda, Kodaira; Kazuhiko Tsutsumi; Noriyuki Shige, both of Odawara; Tokuho Takagaki, Hiratsuka, all of Japan

[73] Assignee: Hitachi, Ltd., Tokyo, Japan

[21] Appl. No.: 677,960

[22] Filed: Jul. 10, 1996

[30] Foreign Application Priority Data

Jul. 13, 1995 [JP] Japan ..................... 7-177089

[51] Int. Cl.$^6$ ..................... B44C 1/22
[52] U.S. Cl. ............... 216/22; 156/345; 216/67
[58] Field of Search .............. 216/22, 67; 156/345 P; 29/603

[56] References Cited

U.S. PATENT DOCUMENTS 5,411,630  5/1995  Nagase et al. ..................... 216/22
5,549,211  8/1996  Nakamura et al. ............... 216/22 X

FOREIGN PATENT DOCUMENTS 3-252922  11/1991  Japan .

*Primary Examiner*—William Powell
*Attorney, Agent, or Firm*—Fay, Sharpe, Beall, Fagan, Minnich & McKee

[57] ABSTRACT

To provide a magnetic disk excellent in floating and sliding characteristics in a low floating area. A magnetic disk having a feature that variations in the height of the projections on each surface of protective films in floating ensured areas on both sides of the magnetic disk are ±15%, and a magnetic disk device on which the magnetic disk is mounted. A surface processing apparatus for a magnetic disk, including: a first electrode for fixing the magnetic disk, the first electrode having an inside diameter larger than the inside diameter of the non-magnetic substrate; an electrically grounded shield for shielding the first electrode; a second electrode, disposed in parallel to the surface of the magnetic disk, for generating plasma against the surface of the magnetic disk; and a plasma control member, disposed at a position separated from the outer edge of the magnetic disk by a specified distance, for controlling plasma generated against the surface of the magnetic disk; wherein a power is applied between the first and second electrodes for plasma-etching the surface of the magnetic disk.

18 Claims, 11 Drawing Sheets

MAGNETIC DISK AND METHOD OF AND APPARATUS FOR MANUFACTURING MAGNETIC DISK

FIELD OF THE INVENTION

The present invention relates to a magnetic disk for a high density magnetic disk device used for a wide variety of applications from large size computers to personal computers; and a method of and apparatus for manufacturing the magnetic disk.

BACKGROUND OF THE INVENTION

A recent tendency in magnetic storage devices used for computers and the like has been toward small size and large capacity. With such a tendency, magnetic recording media having high density recording and high reliability have been required. In general, reducing the recording density requires achieving a reduction in the distance between the magnetic recording film and the magnetic head provided on a magnetic head slider. To reduce such a distance, it is necessary to lower the floating height of the magnetic head above the magnetic disk, and to prevent attraction between the magnetic head and the magnetic disk upon CSS (contact, start, stop) for preventing generation of head crush upon sliding.

In other words, to reduce the distance between the magnetic recording film and a magnetic head, a magnetic disk requires an anti-sliding strength and a floating height stability of a magnetic head. It is well known that an anti-sliding strength and a floating characteristic of a magnetic head slider are improved by forming fine irregularities on the surface of a magnetic disk. Japanese Patent Laid-open No. Hei 3-252922 discloses a method of arranging projections, each having a specified shape, in accordance with a specified rule for improving an anti-sliding strength and a floating characteristic of a magnetic head.

SUMMARY OF THE INVENTION

The above document, Japanese Patent Laid-open No. Hei 3-252922, discloses that unevenness in the the height of the projections on the surface of a magnetic disk exerts an adverse effect on the floating stability of the magnetic disk upon recording/reproducing, more specifically, leading to variations in floating height, thereby lowering the accuracy in recording/reproducing; and in the worst case, such variations in floating height cause a risk of generating an error in reading or writing. The document further describes that the surfaces of the projections should be flattened and the height of all of the projections be kept nearly constant for improving the floating characteristic of the magnetic head.

However, the floating height of the magnetic head is required to be even lower than that disclosed in Japanese Patent Laid-open No. Hei 3-252922 for improving the recording density, and this document does not analyze the floating characteristics for the case where the floating height of a magnetic head is made lower than the conventional value. The present inventors have experimentally examined in detail the relationship between variations in the height of the projections formed on a hard disk and the floating characteristics in an area in which the floating height is low.

An object of the present invention is to solve the above-described problem, and to provide a magnetic disk, preferably of the type conventionally referred to as a hard disk, capable of ensuring floating stability upon recording/reproducing even in low floating height conditions, and a magnetic disk device on which the magnetic disk is mounted.

Another object of the present invention is to solve the above described problem, and to provide a surface processing apparatus as well as a method of manufacturing a magnetic disk for simultaneously processing both surfaces of a magnetic disk, which is used for manufacturing a magnetic disk capable of ensuring floating stability upon recording/reproducing even in low floating height conditions.

To achieve the above first object, the present invention provides a magnetic disk, wherein variations in the height of the projections formed on a surface of the magnetic disk over which a magnetic head slider moves in a floating height condition are specified to be in a range of ±15%.

The present invention also provides a magnetic disk, wherein a surface roughness of the surface of the protective film is larger than that of the surface of the non-magnetic substrate on which the magnetic recording film is formed. The formation of a magnetic recording film having a smooth surface on the substrate allows variation in distance between the magnetic disk and a magnetic head to be reduced by means of the surface structure of the magnetic disk.

The present invention also provides a magnetic disk, wherein variations in the height of the projections on the surface (protective film) of the magnetic disk are preferably in a range of from ±1% to ±10%, at least in a recording/reproducing area.

The present invention also provides a magnetic disk, wherein the surfaces of the non-magnetic substrate and the magnetic recording film are relatively smooth and irregularities are formed on the surface of the protective film; and variations in the height of the projections on the surface of the protective film are in a range of ±15%, at least in a recording/reproducing area.

The present invention also provides a magnetic disk, wherein the surfaces of the non-magnetic substrate and the magnetic recording film are relatively smooth and irregularities are formed on the surface of the protective film; and variations in the height of the projections on the surface of the protective film are in a range of ±10%, at least in a recording/reproducing area.

The present invention also provides a magnetic disk, wherein variations in the height of the the projections on the surface of the protective film are preferably in a range of from ±1% to ±10%, at least in a recording/reproducing area. The present invention also provides a magnetic disk device including: at least one magnetic disk including a non-magnetic substrate on which a magnetic film, a protective film and a lubricating film are formed; a means for rotating the magnetic disk; a magnetic head facing the magnetic disk when the magnetic disk is rotated; and a means for moving and positioning the magnetic head at a suitable position over the magnetic disk; wherein variations in the height of the projections on the surface of the magnetic disk are in a range of ±15%, at least in a recording/reproducing area.

To achieve the above second object, the present invention provides an apparatus for manufacturing a magnetic disk, including: a first electrode for fixing the magnetic disk, the first electrode having an inside diameter larger than the inside diameter of the non-magnetic substrate; an electrically grounded shield for shielding the first electrode; a second electrode, disposed in parallel to the surface of the magnetic disk, for generating a plasma against the surface of the magnetic disk; and a plasma control member, disposed at a position separated from the outer edge of the magnetic disk by a specified distance, for controlling the plasma generated against the surface of the magnetic disk; wherein power is applied between the first and second electrodes for plasma-etching the surface of the magnetic disk.

The present invention also provides an apparatus for manufacturing a magnetic disk, wherein a high frequency power is applied between the first and second electrodes for simultaneously plasma-etching both the surfaces of the magnetic disk.

The present invention also provides an apparatus for manufacturing a magnetic disk, wherein when both surfaces of the protective film of the magnetic disk, respectively on opposite sides of the disk, are simultaneously plasma-etched by applying a high frequency power between the first and second electrodes, variations in etching amounts are in a range of ±15%, at least in a recording/reproducing area.

The present invention also provides an apparatus for manufacturing a magnetic disk, wherein the first electrode has a shape capable of holding the inside diameter portion of the magnetic disk, and is covered with the shield excluding the contact surface with the magnetic disk.

The present invention also provides an apparatus for manufacturing a magnetic disk, wherein the shield covers 90% or less and preferably covers 70% or less of the diameter of the first electrode.

The present invention also provides an apparatus for manufacturing a magnetic disk, wherein the plasma control member is disposed separately from the magnetic disk to be plasma-etched, by a distance being twice, and preferably 1.5 times, the outside diameter of the magnetic disk or less.

The present invention also provides an apparatus for manufacturing a magnetic disk, wherein the distance between the plasma control member and the magnetic disk to be plasma-etched is adjustable.

To achieve the above third object, the present invention provides a method of manufacturing a magnetic disk, including the steps of: fixing a magnetic disk by means of a first electrode having an inside diameter larger than the inside diameter of a non-magnetic substrate; shielding the first electrode with an electrically grounded shield; arranging a second electrode for generating the plasma against the surface of the magnetic disk in such a manner as to be in parallel to the surface of the magnetic disk; arranging a plasma control member for controlling plasma generated against the surface of the magnetic disk at a position separated from the outer edge of the magnetic disk by a specified distance; and applying a power between the first and second electrodes and plasma-etching the surface of the magnetic disk.

The present invention also provides a method of manufacturing a magnetic disk, wherein the first electrode has a shape capable of holding the inside diameter portion of the magnetic disk, and is covered with the shield excluding the contact surface with the magnetic disk.

The present invention also provides a method of manufacturing a magnetic disk, wherein the shield covers 90%, and preferably 70% or less of the diameter of the first electrode.

The present invention also provides a method of manufacturing a magnetic disk, wherein the plasma control member is disposed separately from the magnetic disk to be plasma-etched, by a distance being twice, and preferably 1.5 times the outside diameter of the magnetic disk or less.

The present invention also provides a method for manufacturing a magnetic disk, wherein the distance between the plasma control member and the magnetic disk to be plasma-etched is adjustable.

In the present invention, a gliding characteristic is used to examine a floating characteristic and the height of the projections on the surface of the protective film were measured using a contact-type surface roughness meter, explained as follows.

Measurement points MP were set in a floating ensured area on a disk surface in such a manner that a 0° line was freely selected and three lines were selected to be respectively shifted therefrom by 90°, 180°, and 270° in the circumferential direction; and measurement points for each line were selected to be shifted by a pitch of 5 mm in the radial direction (see FIG. 4). The measurement was made at a contact pressure of 0.2 mN using a probe having a radius of 2 μm.

The measurements were performed three times for each point, and the average of the measured values was taken as an average of the height of the projections at the point. A measured range for one measurement is set at 0.8 mm, and the height of the No.2 Rp calculated in the range is taken as a height of the projections. The variations in height of the projections (±15%) are defined as follows:

$$\{(\text{maximum value} - \text{average value})\}/\text{average value} \times 100 \leq 15\%$$

$$\{(\text{average value} - \text{minimum value})\}/\text{average value} \times 100 \leq 15\%$$

Moreover, when the diameter of a projection is fine enough not to be measured by a contact-type surface roughness meter, it may be measured by an interatomic force microscope (AFM).

FIG. 5 shows a gliding characteristic depending on a floating height. The gliding characteristic was evaluated using a method of detecting projections on the surface of a magnetic disk by allowing a thin film head for the gliding height check (two rail type slider having a size of 2.0 mm×1.6 mm) to have mounted thereon a piezoelectric element and an AE sensor to scan against the surface of a magnetic disk rotating at a specified floating height (height). If a projection is detected at the specified height, the piezoelectric element outputs a detection voltage resulting in an "unacceptable" reading. The criteria for the gliding test was determined by making "acceptable" a sample in which the number of the projections detected in a floating ensured area was counted at zero, and the acceptance ratio in the gliding test was determined using 50 pieces of samples for each condition. Here, the floating ensured area means an area, set by design, of a magnetic disk against which the floating height of a magnetic head slider is ensured, which includes at least a surface area of the magnetic disk over which the magnetic head slider moves in a floating manner.

The results of the gliding test were as follows. In the case where the floating height of a magnetic head was 80 nm, the acceptance ratio in the gliding test was 85% or more even for large variations (±40%) in the height of the projections. However, in the case where the floating height of the magnetic head was lowered to 50 nm, the acceptance ratio in the gliding test was lowered, as variations in the height of the projections were made larger. For example, the acceptance ratio became 90% for variations of ±10% in the height of the projections; and it become 75% for variations of ±20% in the height of the projections. In the case where the floating height of the magnetic head was further lowered to 20 nm, the acceptance ratio in the gliding test showed a steep slope near variations of ±10% in the height of the projections, and it was lowered to 60% or less as variations in the height of the projections were larger than ±10% and smaller than ±20%. In particular, the acceptance ratio in the gliding test is rapidly lowered near variations of ±15% in the height of the projections.

In the present invention, the gliding test was made in the floating ensured area; however, the same result was obtained for the gliding test in the recording/reproducing area.

Thus, it becomes apparent that in the case where the floating height becomes 50 nm or less, the magnetic head moves substantially in contact with the magnetic disk, and consequently projections are detected by contact between the magnetic disk and the magnetic head even in the case where the floating characteristic of the magnetic head is slightly changed due to variations in the height of the projections. In other words, for a low floating height operation, it is required that the variations in the height of the projections on the surface of a magnetic disk be reduced as much as possible in the head floating area for ensuring a high floating stability of the head.

In summary, variations in the height of the projections on the surface of a magnetic disk exert a large effect on the floating characteristic of a magnetic head in a low floating height area. In the case where the floating height of a magnetic head is lowered, the acceptance ratio in the gliding test becomes higher as variations in the height of the projections on the surface of the magnetic disk become smaller. In particular, in the case where a floating height is 50 nm or less, a desirable result in the acceptance ratio can be obtained when variations in the height of the projections are in a range of ±1% to ±15%, and preferably in a range of ±1% to ±10%.

Accordingly, a magnetic disk having an excellent floating characteristic in a low floating height area can be obtained by specifying variations in the height of the projections on the surface of the magnetic disk to be in a range of ±1% to ±15%, and preferably in a range of ±1% to ±10%.

On the other hand, a CSS test in a low floating height area shows that there is a risk of generating head crush when variations in the height of the projections on the surface of a magnetic disk becomes small, for example in a range of ±1%. This is because the initial wear amount, which is generated by the surface of a magnetic head engaging with the surface of a magnetic disk at the beginning of sliding, becomes larger when the height of the projections on the surface of the magnetic disk are even.

It is desirable to make slightly larger variations in the height of the projections for improving a sliding characteristic. The variations in height of the projections are dependent on a roughness of the slider surface of a magnetic head used, and the material of the slider. Moreover, when variations in the height of the projections on the surface of a magnetic disk are made smaller, an adhesive phenomenon tends to be generated between the magnetic disk and a magnetic head, particularly, in a low floating height area.

A seek test was carried out by allowing a magnetic head set at a specified floating height to scan the surface of a rotating magnetic disk in a recording/reproducing area. FIG. 13 shows a relationship between variations in the height of the projections and the wear amounts of the projections after the seek test. The wear amounts Δh of the projections 20 are measured by subtracting the height h2 of the projections 20 after the seek test from the height h1 of the projections before the seek test, as shown in FIGS. 14(a) and 14(b). The seek test was carried out by allowing a magnetic head set at a floating height of 30 nm to scan the surface of a rotating magnetic disk in a recording/reproducing area for 120 hours.

As seen from FIG. 13, when variations in the height of the projections on the surface of the magnetic disk in a low floating area are small, the wear amounts of the projections are increased by the seek test, particularly, they are rapidly increased when variations in the height of the projections are less than ±1%.

When the heights of the projections are uniformly distributed, a lubricating agent adhering on the surfaces of the projections is all removed by contact with a magnetic head slider at the beginning of the seek test, so that the wear rate of the projections is increased. On the other hand, when variations in the height of the projections are made larger, there are present projections that are not brought into contact with the magnetic head at the beginning of the seek test and the lubricating agent adhering on such projections is not removed, so that the wear rate of the projections is retarded.

As a result, the wear amounts of the projections in a low floating height area by the seek test can be lowered by specifying variations in the height of the projections to be more than ±1%. However, from the viewpoint of the above-described floating characteristics, it is desirable to make smaller variations in the height of the projections.

Accordingly, to satisfy both the floating and sliding characteristics, variations in the height of the projections on the surface of a magnetic disk (the surface of the protective film) are in a range of from ±1% to ±15%, preferably, in a range of ±1% to ±10%. According to the invention, to form projections on the surface of a magnetic disk, the projections may be formed on the surface of a protective film. However, they may be formed on a substrate or a magnetic film.

DETAILED DESCRIPTION OF THE PREFERRED EMBODIMENTS

A magnetic disk of the present invention is, for example, fabricated by the following method.

A magnetic film is first formed on a non-magnetic substrate (made of an aluminum alloy substrate on which a hard underlayer film of glass, ceramic, carbon or the like is formed). It is to be noted that an intermediate layer may be formed therebetween for improving adhesiveness and magnetic characteristics. A protective film is then formed on the magnetic film, and solid particles are stuck on the protective film. Plasma etching of the protective layer is performed using the solid particles as a mask member to a thickness less than the depth of the protective film and then the solid particles are removed, to form irregularities on the protective film. A lubricant is then applied thereon, to form a magnetic disk.

A surface processing apparatus for simultaneously processing both sides of a substrate is used for forming irregularities on a protective film by plasma etching. In the present invention, an examination has been made to improve an etching electrode of such a surface processing apparatus. In addition, when irregularities are formed by plasma-etching the protective film, variations in etching amounts become variations in the height of the projections.

Figure 6:
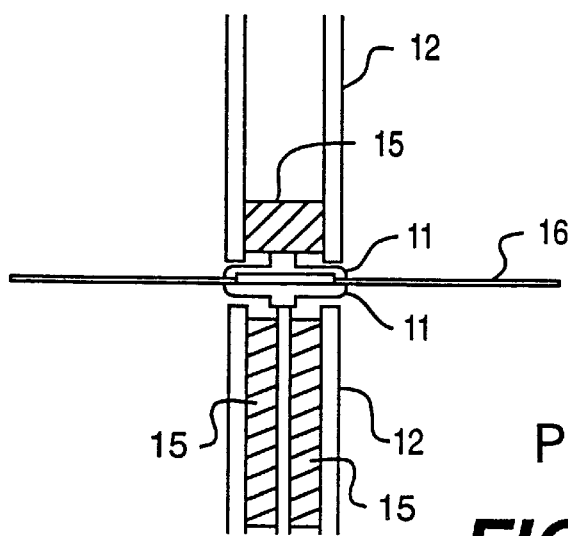
FIG. 6 is a partial schematic view of a conventional inner peripheral electrode arrangement used in plasma etching of a substrate.

As part of the analysis leading to the invention, an etching experiment was performed using a prior art arrangement of a substrate 16 clamped on both sides by an inner peripheral electrode 11 that was surrounded by an earth shield 12 within which was positioned an insulator 15 (see FIG. 6). As a result of this arrangement, a distribution in the etching amounts on the surface of the substrate was observed to be largely varied.

Figure 7:
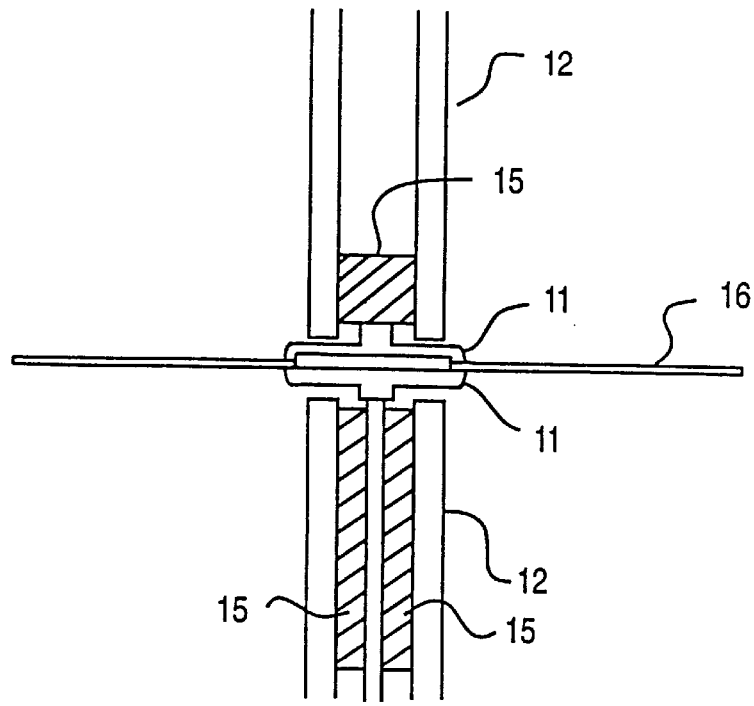
FIG. 7 is a partial schematic view of an inner peripheral electrode arrangement used in plasma etching of a substrate.
Figure 8:
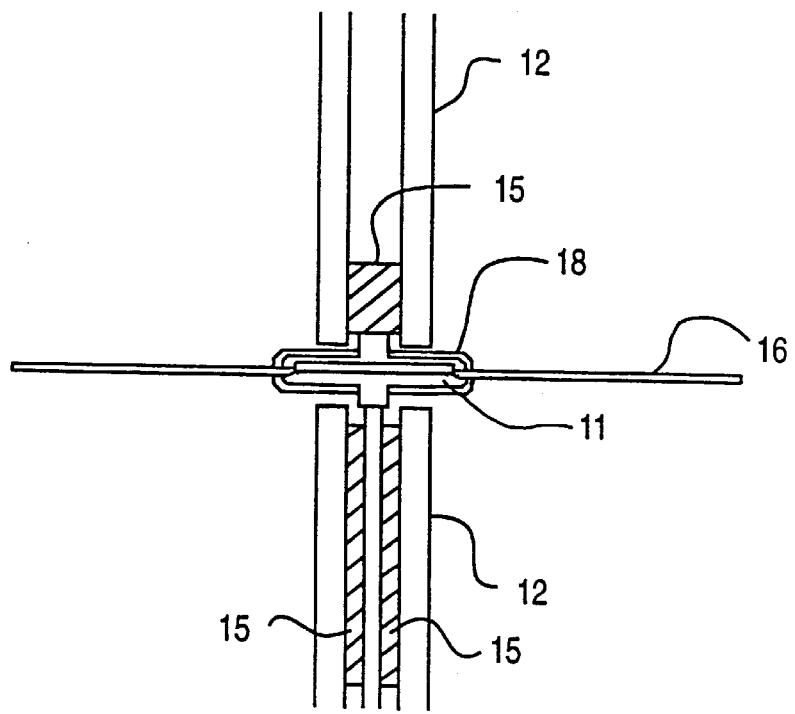
FIG. 8 is a partial schematic view of a modification to the conventional inner peripheral electrode arrangement used in plasma etching of a substrate to which the present invention is applied.

Since the etching distribution was varied, an attempt was made for keeping a uniform etching amount at the inner periphery of a substrate 16 by the FIG. 7 arrangement, in which the same components are identified by like reference numbers. The diameter of earth shield 12 surrounding an inner peripheral electrode 11 clamping the inner periphery of the substrate was reduced as much as possible to extend a plasma generating range up to the inner periphery of the substrate. As a result, the etching amount at the inner periphery of the substrate 16 was increased, to obtain a uniform distribution in etching amounts over the entire surface of the substrate 16. The reduced diameter of the earth shield, however, causes a disadvantage in that plasma is naturally generated even on the inner peripheral electrode 11, to sputter the electrode material, and the electrode material thus sputtered remains as contamination at the inner periphery of the substrate. To achieve a reduction in the diameter of an earth shield for equalizing a distribution in etching amounts without the above disadvantage, the present inventors, as part of the invention, cover the surface of the inner peripheral electrode with an anti-etching insulating material.

For example, alumina was selected as an anti-etching insulating material and applied by thermal spraying on the surface of the inner peripheral electrode (hereinafter, this coating is referred to as "alumina thermal spraying").

(1) In the case of using oxygen as a process gas for etching

Figure 9A:
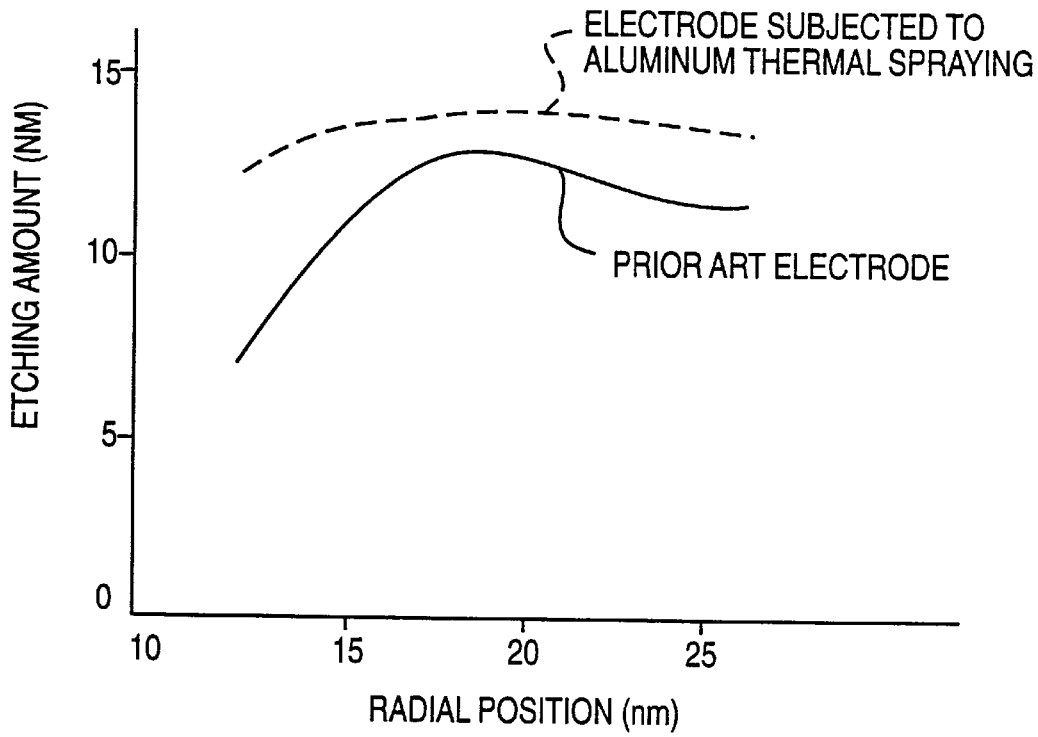
FIGS. 9(a) and 9(b) are graphs each showing a distribution in etching amounts which is dependent on the structure of an inner peripheral electrode.

FIG. 9(a) shows a distribution of the etching amounts for a sample wherein a protective film on a 2.5 inch substrate was etched using a prior art inner peripheral electrode (diameter of inner peripheral electrode: 22 mm, diameter of earth shield: 22 mm), and a distribution in etching amounts for a sample wherein the protective film on the 2.5 inch substrate was etched using an inner peripheral electrode subjected to alumina thermal spraying and being surrounded by an earth shield having the reduced diameter (diameter of inner peripheral electrode: 22 mm, diameter of earth shield: 11 mm). The etching conditions for these samples were as follows:

power supply: high frequency power supply of 13.56 MHz applied power: 50 W gas pressure: 0.1 Torr etching time: 8 seconds As is apparent from FIG. 9(a), the etching amount at the inner periphery of the substrate is increased by making smaller the diameter of the earth shield around the inner peripheral electrode. The surface of the inner periphery of the substrate after etching was then analyzed using full-reflection fluorescent X-ray, which showed a result that any peak in contamination was not recognized in the material of the inner peripheral electrode.

In the case of oxygen etching, the etching is performed by chemical reaction by oxygen radicals, so that the surface of the inner peripheral electrode is not necessarily covered with an insulating material.

(2) In the case of using argon as a process gas for etching

Figure 9B:
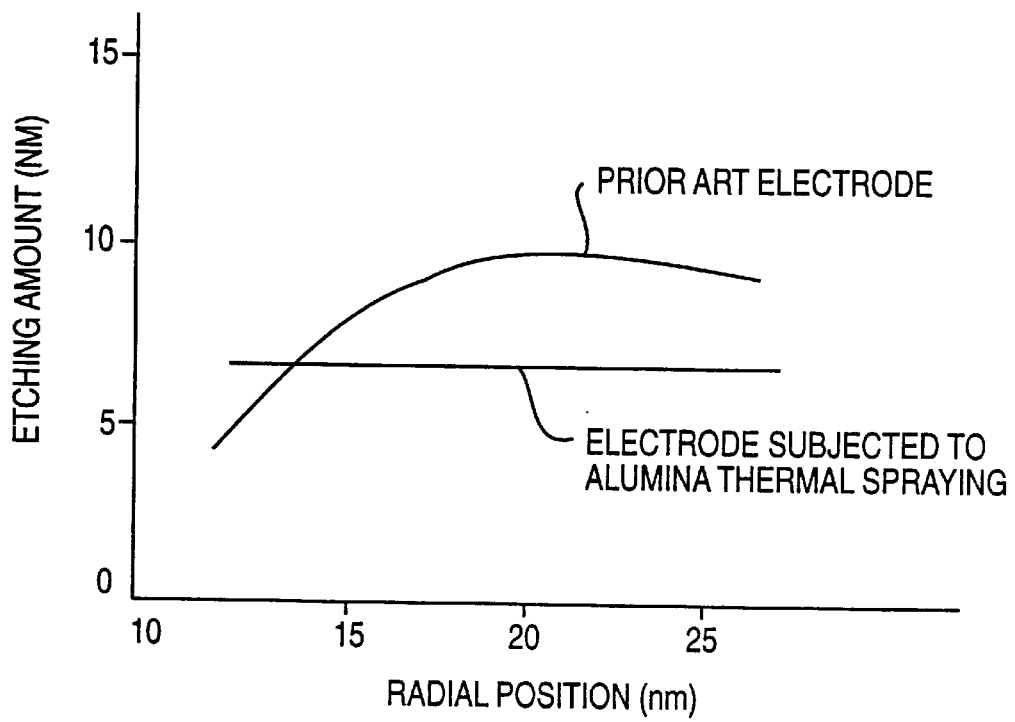

FIG. 9(b) shows a distribution of etching amounts for a sample in which a protective film on a 2.5 inch substrate is etched using an inner peripheral electrode that differs with respect to the one used to obtain the results shown in FIG. 9(a) in that the diameter of the inner peripheral electrode is 22 mm whereas the diameter of earth shield is 11 mm, i.e. the arrangement used was similar to the one shown in FIG. 7. Also, FIG. 9(b) shows the results of the distribution of etching amounts for a sample in which the protective film on the 2.5 inch substrate is etched using an inner peripheral electrode arrangement according to the FIG. 7 embodiment and which is further subjected to alumina thermal spraying. Specifically, the arrangement included the inner peripheral electrode being surrounded by an earth shield having the reduced diameter, i.e. the diameter of the inner peripheral electrode was 22 mm and the diameter of the earth shield was 11 mm. The etching conditions for these samples were as follows:

power supply: high frequency power supply of 13.56 MHz applied power: 100 W gas pressure: 0.3 Torr As is apparent from FIG. 9(b), a distribution of the etching amounts at the inner periphery of the substrate is increased by making the diameter of the earth shield smaller with respect to the inner peripheral electrode. The surface of the inner periphery of the protective film on the substrate after etching was then analyzed using full-reflection fluorescent X-ray, which showed a result that no contamination peaks were recognized of the material of the inner peripheral electrode.

The examinations (1) and (2) show that it is important to make the diameter of an earth shield smaller with respect to the inner peripheral electrode and hence to extend a plasma generating range up to the inner periphery of a substrate for increasing the etching amount at the inner periphery of a protective film on the substrate. The diameter of the earth shield should preferably be in a range of 90% or less, more preferably, 70% or less of the diameter of the inner peripheral electrode. However, to make the diameter of an earth shield smaller than the diameter of an inner peripheral electrode, it is required to cover the surface of the inner peripheral electrode with an anti-etching insulating material for preventing deposition of contamination on the surface of the magnetic disk.

Figure 3:
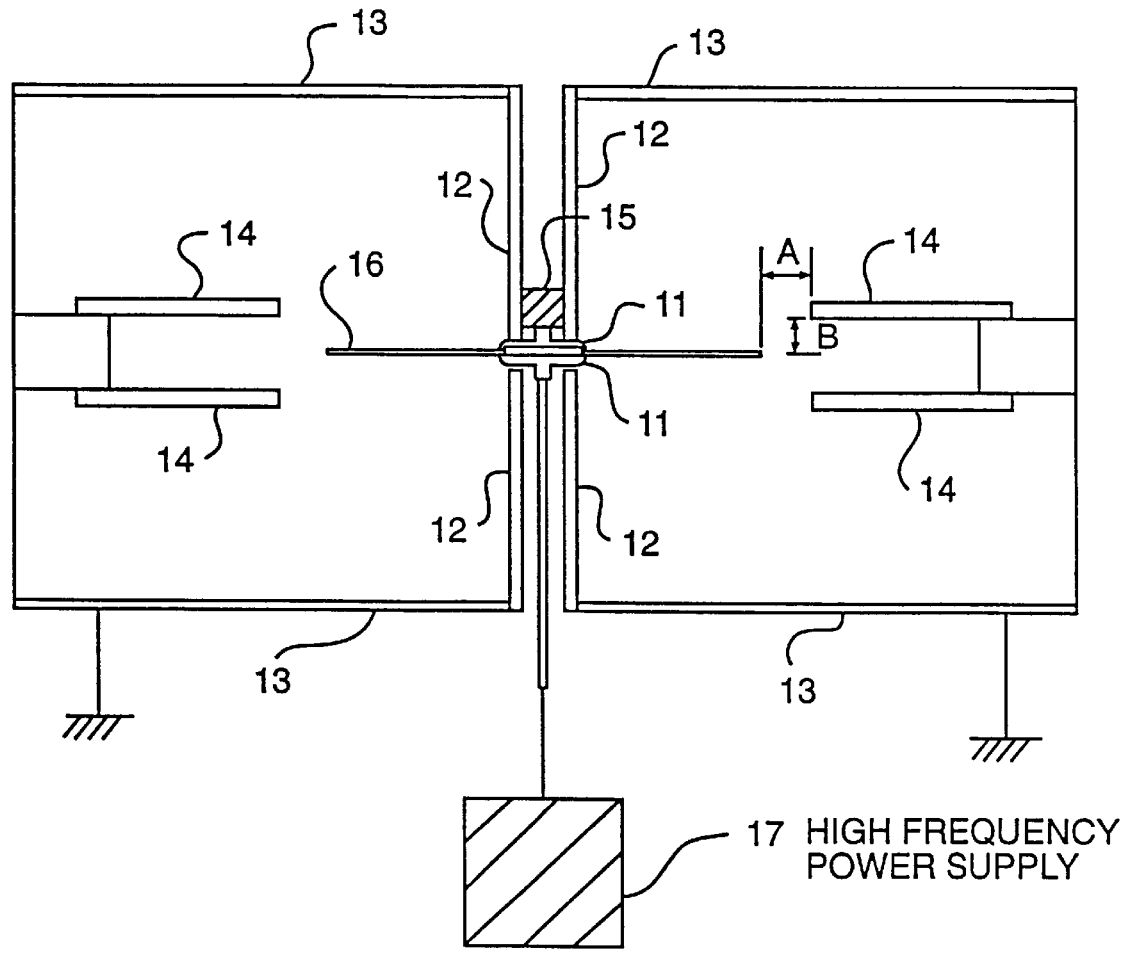
FIG. 3 is a view illustrating an arrangement of an etching electrode for etching the magnetic disk shown in FIG. 1.
Figure 4:
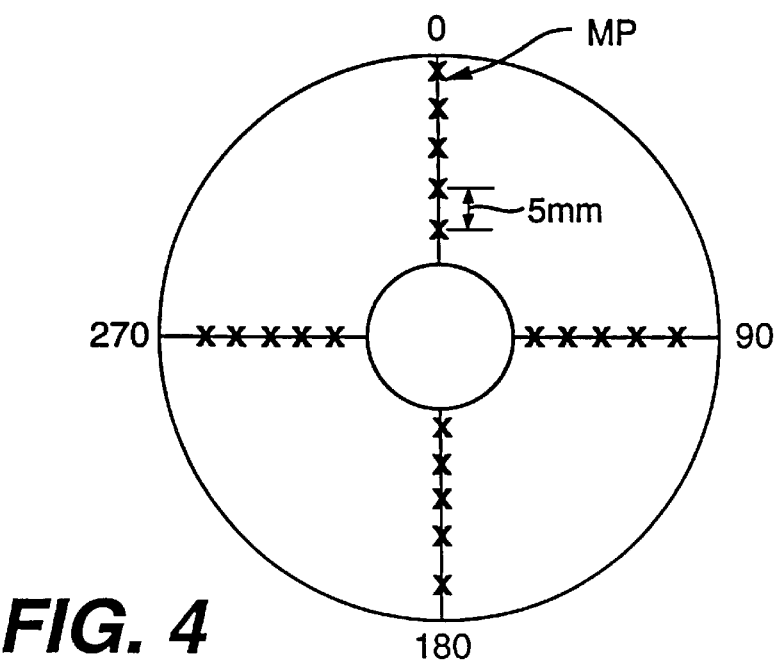
FIG. 4 is a view showing positions where the height of the projections on a magnetic disk are measured.
Figure 5:
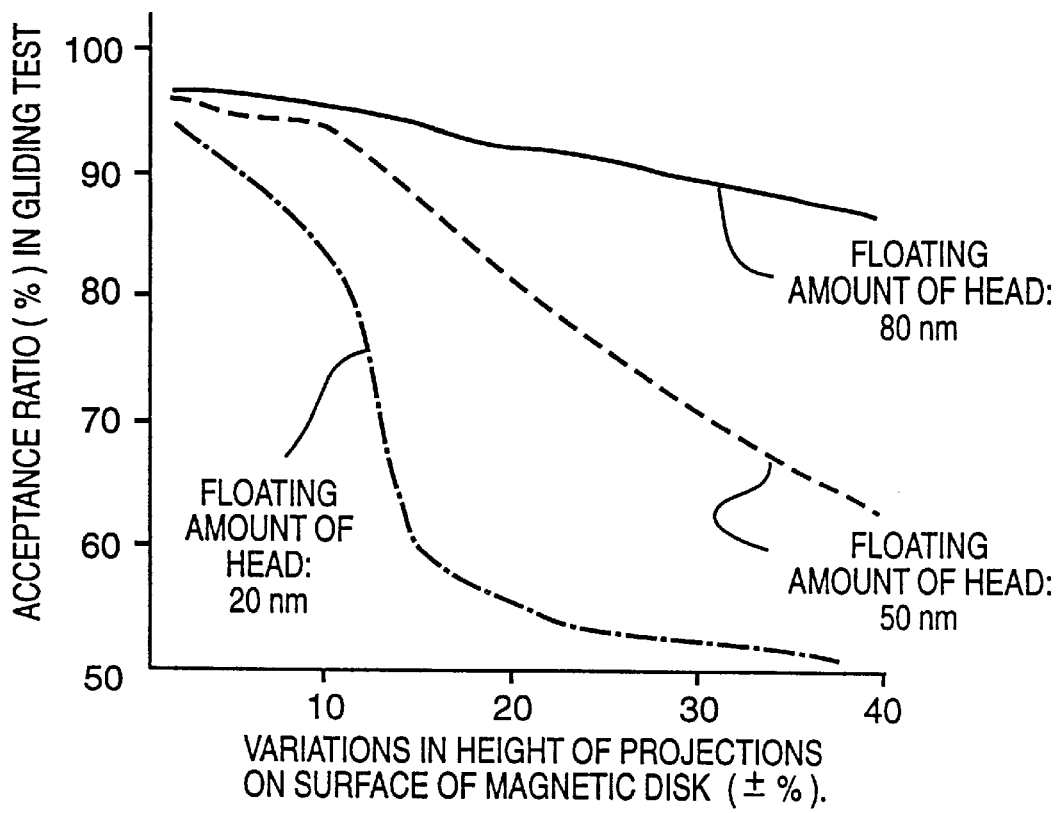
FIG. 5 is a graph showing a relationship between variations in the height of the projections on the magnetic disk and a gliding characteristic.

The inventors also sought to equalize the etching amounts in an area of a protective film on a substrate from an intermediate portion to the outer periphery thereof. As shown in FIG. 3, the preferred embodiment of the apparatus of the invention provides control of the etching amounts so that they can be equalized by controlling a plasma generating area using a disk-like or cylindrical outer peripheral ring 14. The outer peripheral ring 14 has an inside diameter larger than that of the outside diameter of the substrate 16 and is disposed separately from the outer end of the substrate by specified distances A and B. The apparatus has earth shields 12 separated by insulators 15. For generating the plasma, a high frequency power source 17 is connected to electrodes 11. Additionally, facing electrodes 13 are provided. A vacuum chamber, not shown, is provided for containing a process gas. It is understood that although the facing electrodes are shown as being grounded, the inner peripheral electrodes 11 may be grounded and the RF power supply 17 connected to the facing electrodes 13. The function of the outer peripheral ring 14 will be fully described below.

Figure 10A:
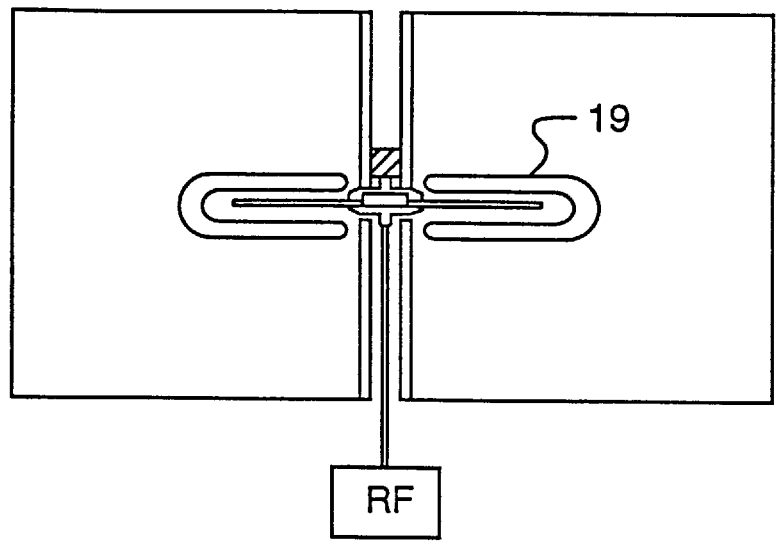
FIGS. 10(a) and 10(b) are explanatory views showing plasma generated at the time of plasma etching of a magnetic disk substrate.
Figure 10B:
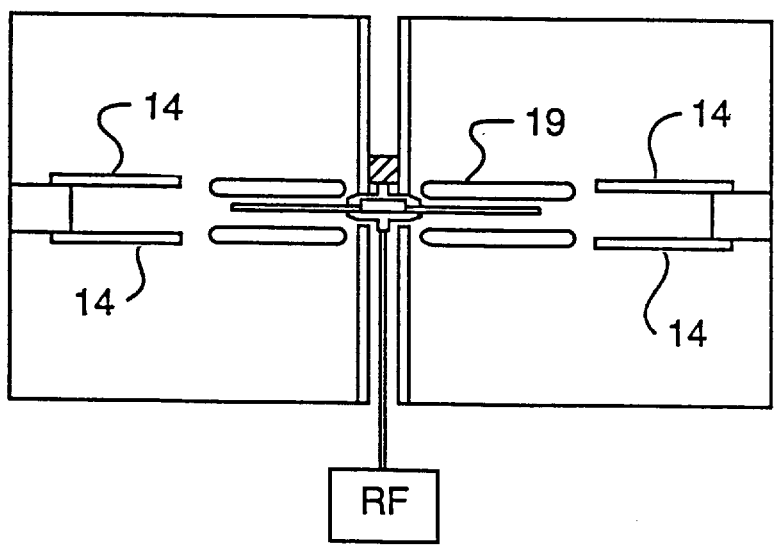
Figure 11:
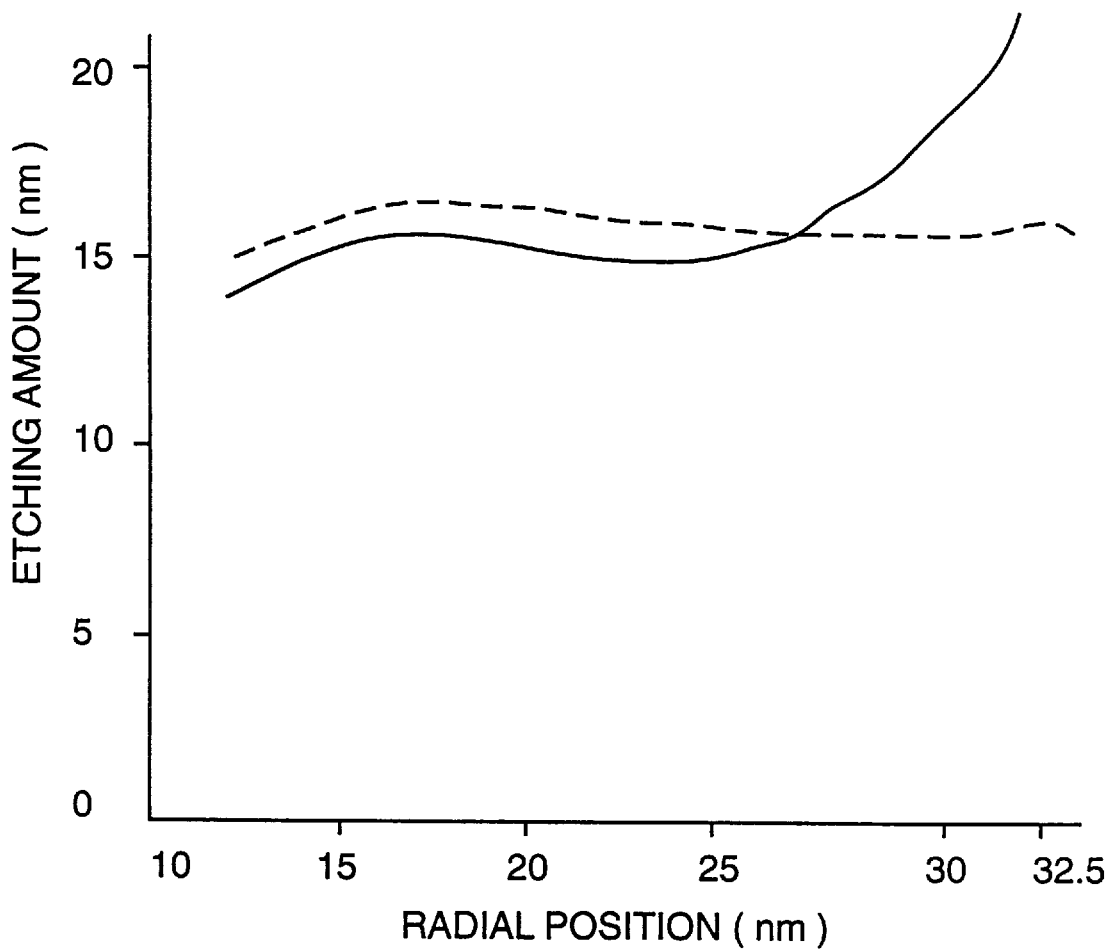
FIG. 11 is a graph showing a distribution in etching amounts in the apparatus using an etching electrode to which the present invention is applied.

In FIG. 11, a curve (a) shows a distribution in etching amounts for a sample in which a protective film on a 2.5 inch substrate is etched using an etching electrode having an inner peripheral electrode (diameter: 22 mm) subjected to alumina thermal spraying and an earth shield having the reduced diameter (diameter : 11 mm); while a curve (b) shows a distribution in etching amounts for a sample in which the protective film on the 2.5 inch substrate is etched using an etching electrode having an inner peripheral electrode (diameter: 22 mm) subjected to alumina thermal spraying, an earth shield having the reduced diameter (diameter : 11 mm), and an outer peripheral ring 14 [inside diameter: 79 mm, A=7 mm, B=6 mm (see FIG. 3)]. The etching conditions for these samples were as follows:

process gas: oxygen power supply: high frequency power supply of 13.56 MHz applied power: 60 W gas pressure: 0.1 Torr etching time: 10 seconds As is apparent from FIG. 11, and as explained with reference to FIGS. 10(a) and 10(b), a distribution in etching amounts in an area from the intermediate portion to the outer periphery of a protective film on a substrate is increased by provision of the outer peripheral ring 14 to the etching electrode. In general, as shown in FIG. 10(a), a plasma 19 is concentrated at the outer periphery of a substrate due to the electric field concentrated at the outer periphery so that an etching amount at the outer periphery is larger than that at the inner periphery. In the present invention, as shown in FIG. 10(b), to avoid the concentration of the electric field at the outer periphery of the substrate, the outer peripheral ring 14 is set to be close to the plasma generating area, thus thus controlling the shape of the plasma that is generated and providing a uniform plasma 19' for etching the substrate. In this type of an arrangement, the controlling of the shape of the plasma that is generated, including the thickness of the plasma that is generated is changed due to the gas pressure, kind of gas and the like, and accordingly the shape and position of the outer peripheral ring 14 may be suitably adjusted in accordance with the kind of gas and gas pressure used for plasma etching.

The inside diameter of the outer peripheral ring 14 is preferably larger than the outside diameter of the substrate and is less than twice the inside diameter of the substrate, and more preferably in a range of 1.5 times the inside diameter of the substrate or less. The outer peripheral ring 14 and support block 14' is made of a conductive material and provided at the same potential as that of the facing electrodes 13. Alternatively, the outer peripheral ring 14 may be made of a conductive material and the support block 14' made of an insulator so that the electric potential of ring 14 is floated.

In summary, a distribution in etching amounts on the surface of a protective film on a substrate can be equalized by making the diameter of an earth shield around an inner peripheral electrode as small as possible; covering the surface of the inner peripheral electrode with an anti-etching insulating material; and arranging a disk-like or cylindrical outer peripheral ring 14 having an inside diameter larger than the outside diameter of the substrate in such a manner as to be separated from the outer edge of the substrate by a specified distance.

A magnetic disk was fabricated using the surface processing apparatus including the etching electrode having the above structure in accordance with the above-described manufacturing method of the present invention. In the magnetic disk thus fabricated, variations in the height of the projections on the surface of a protective film were in a range of ±10%.

This magnetic disk, thus having small variations in the height of the projections on the surface of the magnetic disk, showed an excellent floating stability in the case of allowing a magnetic head to scan over the surface of the magnetic disk in a low floating height area, and an excellent acceptance ratio in the gliding test in a low floating height area.

As a result, a magnetic disk excellent in floating characteristic in a low floating height area can be fabricated using the surface processing apparatus including an etching electrode of the present invention.

According to the present invention, there is provided a magnetic disk capable of preventing the contact between a magnetic head and a magnetic disk even in a low floating height area, and ensuring a high floating stability of the magnetic head, by specifying variations in the height of the projections on each of the surfaces of the protective films in floating ensured areas on both sides of the magnetic disk to be in a range of ±15%.

According to the present invention, it is possible to provide a surface processing apparatus for simultaneously processing both sides of a magnetic disk while controlling variations in the height of the projections on the surface of a protective film on the magnetic disk. Moreover, according to the present invention, it is possible to fabricate a magnetic disk in which variations in the height of the projections on the surface of a protective film is in a range of ±15% using the above surface processing apparatus.

Hereinafter, embodiments of the present invention will be described. For comparison, a comparative example will be also described. Each of these embodiments concerns a magnetic disk excellent in floating and sliding characteristics, in which variations in the height of the projections on the surface of a protective film are in a range of ±15%.

(Embodiment 1)

Figure 1:
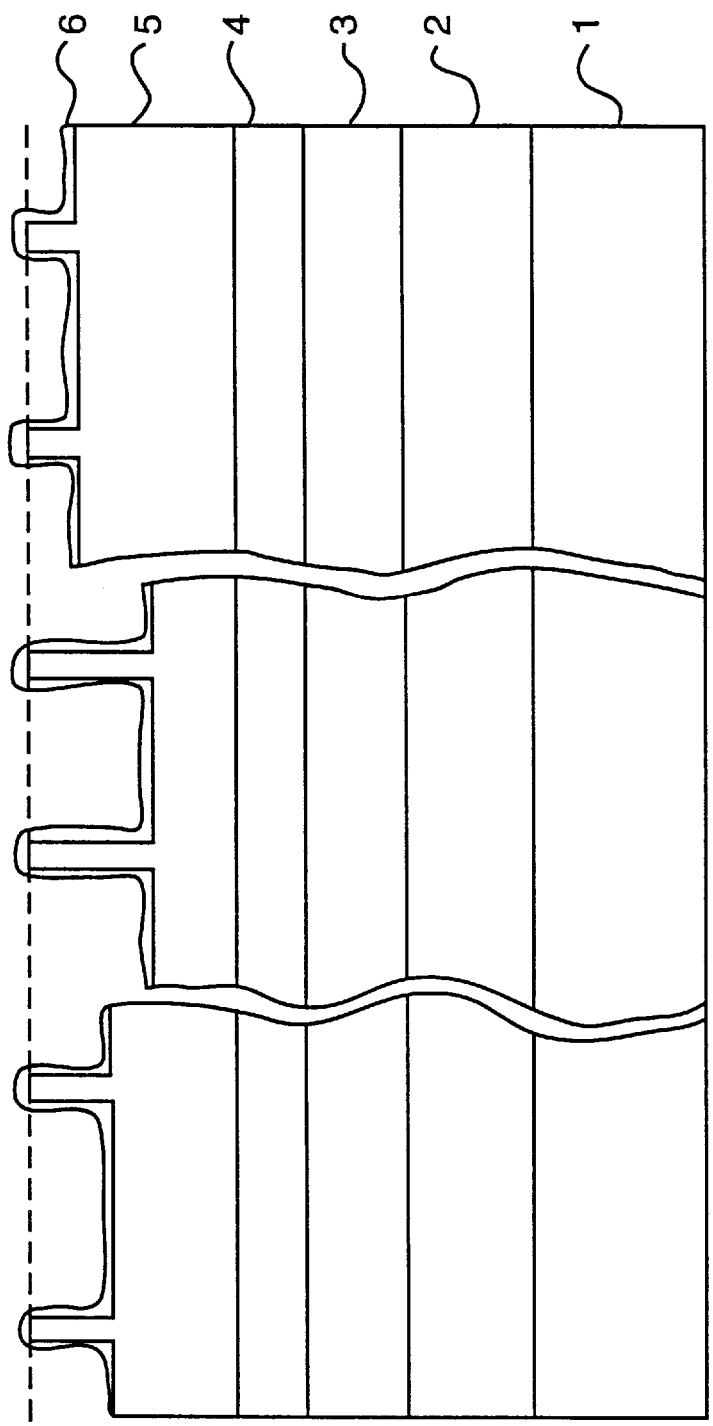
FIG. 1 is a partial sectional view of a magnetic disk as one embodiment of the present invention.

In a magnetic disk of this embodiment, irregularities are formed on a protective film of a substrate by etching. FIG. 1 is a sectional view of the magnetic disk of this embodiment. In this figure, reference numeral 1 indicates an aluminum alloy substrate; 2 is a Ni—P alloy film formed on the substrate 1 by electroless plating; 3 is a Cr underlayer film formed by sputtering; 4 is a Co—Cr based magnetic film formed by sputtering; 5 is a carbon based protective film; and 6 is a lubricating film. The projections 20 are shown, schematically, to be spaced out across the surface of the protective film layer 5. According to a preferred embodiment, the area ratio, that is the ratio of the area of the protective film surface that has the projections 20 formed thereon to the area thereof in which there are no projections, is 4–5%.

A disk substrate formed of a 2.5 inch aluminum substrate having the Ni—P alloy film 2 formed thereon was first prepared as a sample. The surface of the Ni—P alloy film 2 was subjected to texture processing (average roughness Ra of the surface: 2 nm), and then a Cr film (thickness: 50 nm) as the underlayer film 3 and a Co—Cr—Pt magnetic alloy film (thickness: 30 nm) as the magnetic film 4 were laminated on the Ni—P alloy film 2. Subsequently, an amorphous carbon film (thickness: 30 nm) as the protective film 5 was laminated on the magnetic film 4 using a mixed gas of argon and hydrogen (mixing ratio of hydrogen: 10%) by reactive sputtering.

Solid particles as a mask material were stuck on the surface of the amorphous carbon film 5. Plasma etching was applied on the amorphous carbon film 5 using oxygen or argon as a process gas to a thickness less than the depth of the amorphous carbon film 5, and then the solid particles were removed, to form irregularities (projections) on the surface of the amorphous carbon film 5.

One example of the above plasma etching process will be described in detail. The plasma etching was performed using a surface processing apparatus capable of simultaneously processing both sides of a substrate. The surface processing apparatus has an etching electrode of the present invention (diameter of inner peripheral electrode subjected to alumina thermal spraying: 22 mm, diameter of earth shield: 11 mm, and inside diameter of outer peripheral ring 14: 79 mm, A=7 mm, B=6 mm). The inside of a process chamber was evacuated to $1\times10^{-3}$ Torr by a vacuum pump, and then oxygen gas was introduced to adjust the gas pressure at 0.1 Torr. Plasma was generated in the process chamber by applying a power of 60 W from a high frequency power supply of 13.56 MHz, and plasma etching was performed for 10 seconds. Argon gas was then introduced to adjust the gas pressure to 0.3 Torr. Plasma was generated again in the process chamber by applying a power of 100 W from the high frequency power supply of 13.56 MHz, and plasma etching was performed for 10 seconds.

The surface of the sample thus obtained was coated with a perfluoropolyether based lubricant to a thickness of 20 Å, to form a magnetic disk.

Height of the projections on each of the surfaces of the protective films in floating ensured areas on both sides of the magnetic disk were measured using a contact-type surface roughness meter. As a result, the average value was 17 nm; the minimum value was 16.5 nm; the maximum value was 17.5 nm; and variations in the height of the projections were ±2.9%.

The gliding characteristic of this magnetic disk was evaluated.

The acceptance ratio for each floating height in the gliding test showed a preferable floating characteristic (96% for the floating height of 60 nm; 94% for the floating height of 40 nm; and 92% for the floating height of 20 nm). The magnetic disk was then subjected to a CSS test using a thin film magnetic head. As a result, the friction coefficient was not changed after 50 cycles of CSS and the head was not crushed. Even in a test of stopping the device after 30 cycles of CSS, holding it for 48 hours, and starting it, the device showed a preferable characteristic without generation of any attraction between the magnetic head and the magnetic disk.

Embodiment 2

In this embodiment, a magnetic disk was fabricated in the same manner as in Embodiment 1, except for the structure (diameter of the earth shield) of the etching electrode of the surface processing apparatus used for forming irregularities on the surface of a protective film. The structure of the etching electrode was as follows: the diameter of the inner peripheral electrode subjected to alumina thermal spraying was 22 mm; the diameter of the earth shield was 13 mm; and the inside diameter of the outer peripheral ring 14 was 79 mm (A=7 mm, B=6 mm).

The height of the projections on each of the surfaces of the protective films in floating ensured areas on both sides of the magnetic disk were measured using a contact-type surface roughness meter. As a result, the average value was 17 nm; the minimum value was 16 nm; the maximum value was 18 nm; and variations in the height of the projections were ±5.8%.

The gliding characteristic of this magnetic disk was evaluated in the same manner as in Embodiment 1. The acceptance ratio for each floating height in the gliding test showed a preferable floating characteristic (92% for the floating height of 60 nm; 90% for the floating height of 40 nm; and 88% for the floating height of 20 nm). The magnetic disk was then subjected to the CSS test using a thin film magnetic head. As a result, the friction coefficient was not changed after 50 cycles and the disk was not crushed. Even in a test of stopping the device after 30 cycles of CSS, holding it for 48 hours, and starting it, the device showed a preferable characteristic without generation of any attraction between the magnetic head and the magnetic disk.

Embodiment 3

In this embodiment, a magnetic disk was fabricated in the same manner as in Embodiment 1, except for the etching condition (gas pressure) in the plasma etching process for forming irregularities on the surface of the protective film. The plasma etching process was performed as follows. The inside of a process chamber was evacuated to $1\times10^{-3}$ Torr by a vacuum pump, and oxygen gas was introduced to adjust a gas pressure at 0.30 Torr. Plasma was generated in the process chamber by applying a power of 60 W from a high frequency power supply of 13.56 MHz, and plasma etching was performed for 10 seconds. Argon gas was then introduced to adjust the gas pressure to 0.3 Torr. Plasma was generated again in the process chamber by applying a power of 100 W from the high frequency power supply of 13.56 MHz, and plasma etching was performed for 10 seconds.

The height of the projections on each of the surfaces of the protective films in floating ensured areas on both sides of the magnetic disk were measured using a contact-type surface roughness meter. As a result, the average value was 17 nm; the minimum value was 15.4 nm; the maximum value was 18.4 nm; and variations in the height of the projections were ±9.4%.

The gliding characteristic of this magnetic disk was evaluated in the same manner as in Embodiment 1. The acceptance ratio for each floating height in the gliding test showed a preferable floating characteristic (86% for the floating height of 60 nm; 84% for the floating height of 40 nm; and 82% for the floating height of 20 nm).

Embodiment 4

In this embodiment, a magnetic disk was fabricated in the same manner as in Embodiment 1, except for the etching condition (gas pressure) in the plasma etching process for forming irregularities on the surface of the protective film.

The plasma etching process was performed as follows. The inside of a process chamber was evacuated to 1×10⁻³ Torr by a vacuum pump, and oxygen gas was introduced to adjust a gas pressure at 0.35 Torr. Plasma was generated in the process chamber by applying a power of 60 W from a high frequency power supply of 13.56 MHz, and plasma etching was performed for 10 seconds. Argon gas was then introduced to adjust the gas pressure at 0.3 Torr. Plasma was generated again in the process chamber by applying a power of 100 W from the high frequency power supply of 13.56 MHz, and plasma etching was performed for 10 seconds.

The height of the projections on each of the surfaces of the protective films in floating ensured areas on both sides of the magnetic disk were measured using a contact-type surface roughness meter. As a result, the average value was 17 nm; the minimum value was 14.8 nm; the maximum value was 19.2 nm; and variations in the height of the projections were ±13%.

The gliding characteristic of this magnetic disk was evaluated in the same manner as in Embodiment 1. The acceptance ratio for each floating height in the gliding test showed a preferable floating characteristic (85% for the floating height of 60 nm; and 88% for the floating height of 40 nm).

Embodiment 5

In this embodiment, a magnetic disk was fabricated in the same manner as in Embodiment 1, except for using a reinforced glass substrate (outside diameter: 2.5 inches) subjected to mirror-like polishing to have an average roughness (Ra) of 1 nm or less. The height of the projections on each of the surfaces of the protective films in floating ensured areas on both sides of the magnetic disk were measured using a contact-type surface roughness meter. As a result, the average value was 17 nm; the minimum value was 16.6 nm; the maximum value was 17.4 nm; and variations in the height of the projections were ±2.3%.

The gliding characteristic of this magnetic disk was evaluated in the same manner as in Embodiment 1. The acceptance ratio for each floating height in the gliding test showed a preferable floating characteristic (96% for the floating height of 60 nm; 94% for the floating height of 40 nm; and 92% for the floating height of 20 nm).

Embodiment 6

In this embodiment, irregularities are formed on the surface of a substrate. A reinforced glass substrate (outside diameter: 2.5 inches) subjected to mirror-surface polishing to have an average roughness (Ra) of 1 nm or less was used. A Cr film (thickness: 50 nm) was laminated on the substrate by sputtering and a carbon film (thickness: 20 nm) was then laminated on the Cr film by sputtering using argon. Solid particles as a mask material were stuck on the surface of the carbon film. A plasma etching process was applied to the substrate using oxygen or argon as a process gas to a thickness equivalent to the depth of the carbon film, and then the solid particles were removed, to form irregularities on the surface of the substrate. The etching condition was the same as in Embodiment 1. Next, a Cr film (thickness: 50 nm) as the underlayer film 3, a Co—Cr—Pt magnetic alloy film (thickness: 30 nm) as the magnetic film 4 were laminated on the substrate by sputtering. Subsequently, an amorphous carbon film (thickness: 30 nm) as the protective film 5 was then laminated on the magnetic film using a mixed gas of argon and hydrogen (mixing ratio of hydrogen: 10%) by reactive sputtering. The surface of the sample thus obtained was coated with a perfluoropolyether based lubricant to a thickness of 20 Å, to form a magnetic disk.

Height of the projections on each of the surfaces of the protective films in floating ensured areas on both sides of the magnetic disk were measured using a contact-type surface roughness meter. As a result, the average value was 17 nm; the minimum value was 16.3 nm; the maximum value was 17.7 nm; and variations in the height of the projections were ±4.1%.

The gliding characteristic of this magnetic disk was evaluated in the same manner as in Embodiment 1. The acceptance ratio for each floating height in the gliding test showed a preferable floating characteristic (94% for the floating height of 60 nm; 92% for the floating height of 40 nm; and 90% for the floating height of 20 nm).

Embodiment 7

Figure 2:
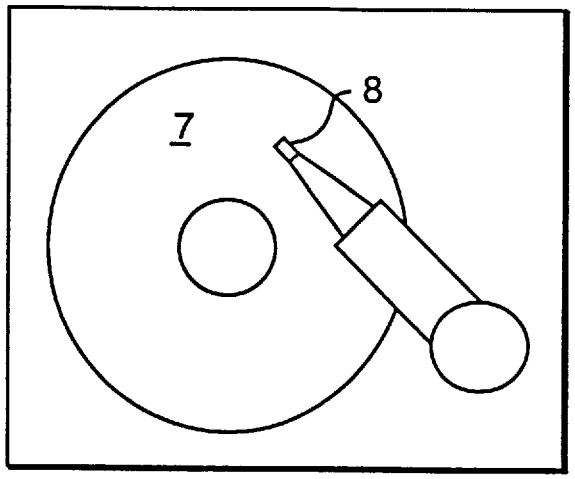
FIGS. 2(a) and 2(b) are schematic views of a magnetic disk device mounting the magnetic disk shown in FIG. 1.
Figure 2B:
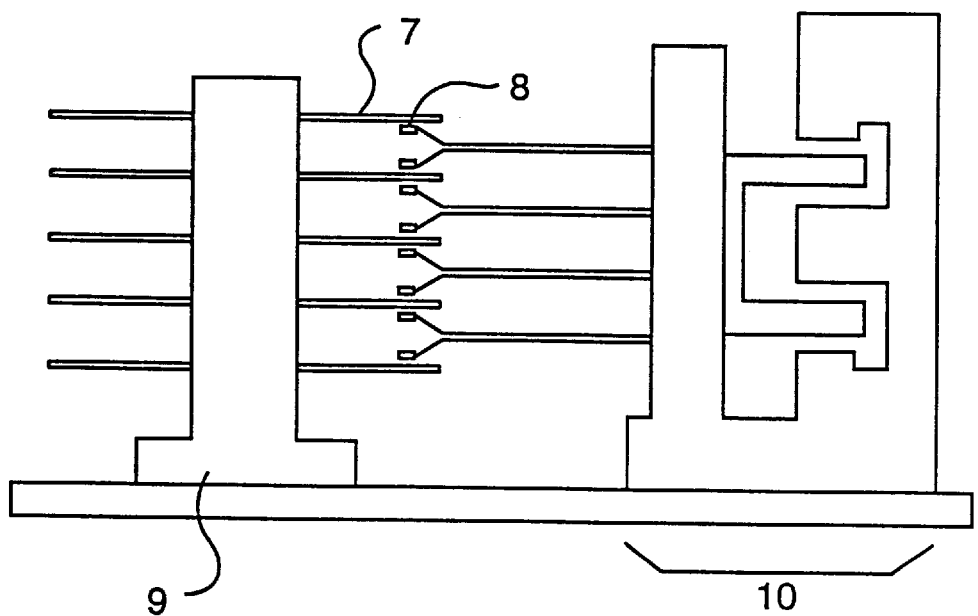

In this embodiment, the magnetic disk shown in FIG. 1 was applied to a magnetic disk device shown in FIGS. 2(a) and 2(b). The magnetic disk device includes a plurality of magnetic disks 7; a plurality of magnetic heads formed on a plurality of magnetic head sliders 8 for recording/reproducing information to/from the magnetic disks 7; a rotational mechanism unit 9 for rotating the magnetic disks 7; a rotary actuator 10 for positioning the magnetic heads at target positions on the magnetic disks 7; and a signal processing unit and a control unit (not shown).

In this embodiment, two pieces of the magnetic disks, and four pieces of the magnetic heads were used. A test was performed for checking a high density recording/reproducing performance in a condition that the magnetic heads were rotated over the magnetic disk at a high rotational speed (floating height: 30 nm).

As a result, the friction coefficient was not changed after 50 cycles and the disk was not crushed. Even in a test of stopping the device after 30 cycles of CSS, holding it for 48 hours, and starting it, the device showed a preferable characteristic without generation of any attraction between the magnetic head and the magnetic disk.

In addition, during operation, any error was not generated, and signals excellent in S/N could be ensured for a long period.

(Comparative Example)

In this comparative example, there will be described a magnetic disk failing to satisfy any desirable floating and sliding characteristics in a low floating height area.

(Comparative Example 1)

In this example, a magnetic disk was fabricated in the same manner as in Embodiment 1, except that the structure of the etching electrode of the surface processing apparatus has no outer peripheral ring. The structure of the etching electrode was as follows: the diameter of the inner peripheral electrode was 22 mm; and the diameter of the earth shield was 22 mm.

Height of the projections on each of the surfaces of the protective films in floating ensured areas on both sides of the magnetic disk were measured using a contact-type surface roughness meter. As a result, the average value was 17 nm; the minimum value was 12 nm; the maximum value was 22 nm; and variations in the height of the projections were ±30%.

The gliding characteristic of this magnetic disk was evaluated in the same manner as in Embodiment 1. The acceptance ratio for each floating height in the gliding test showed a poor floating characteristic (62% for the floating height of 60 nm; 55% for the floating height of 40 nm; and 52% for the floating height of 20 nm).

Figure 12:
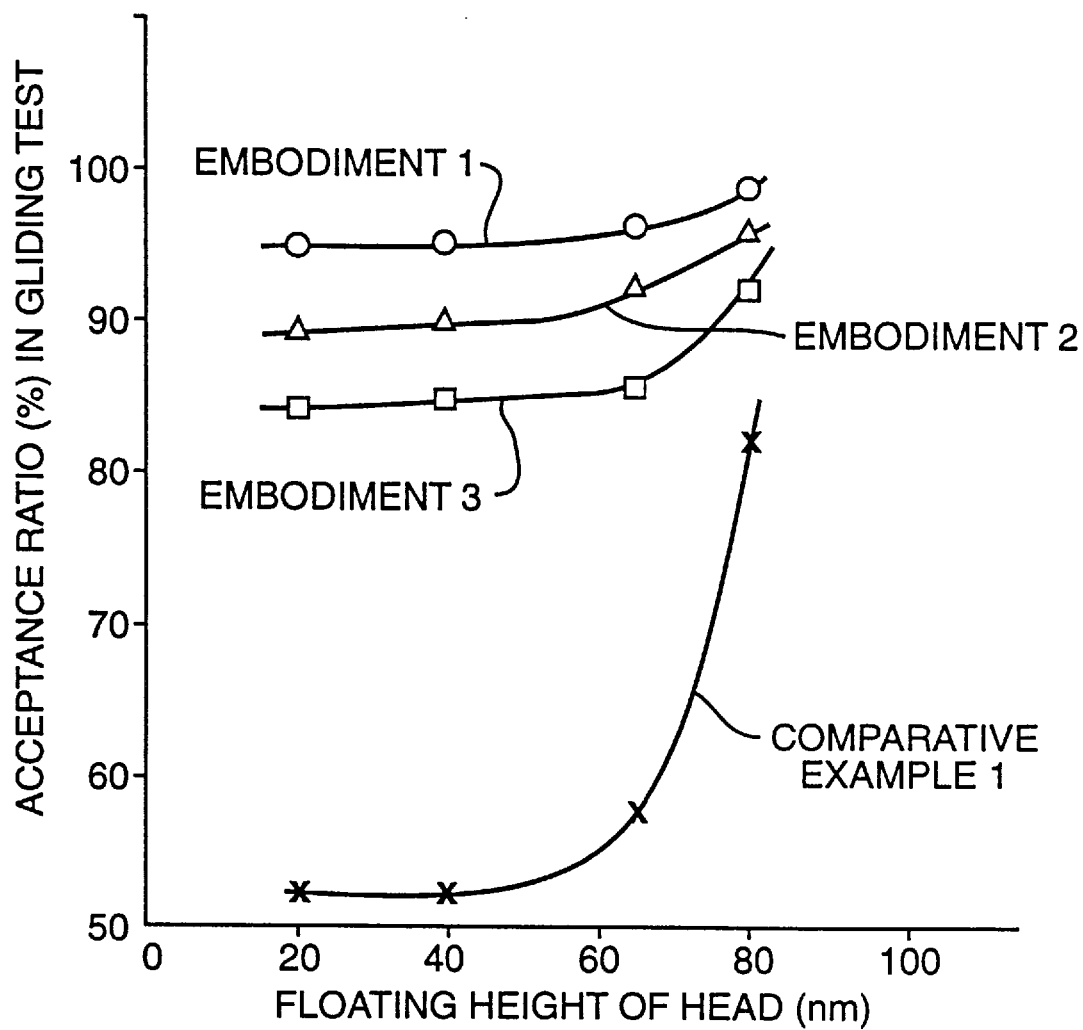
FIG. 12 is a graph showing a relationship between variations in the height of the projections on the surface of a magnetic disk and a gliding characteristic.
Figure 13:
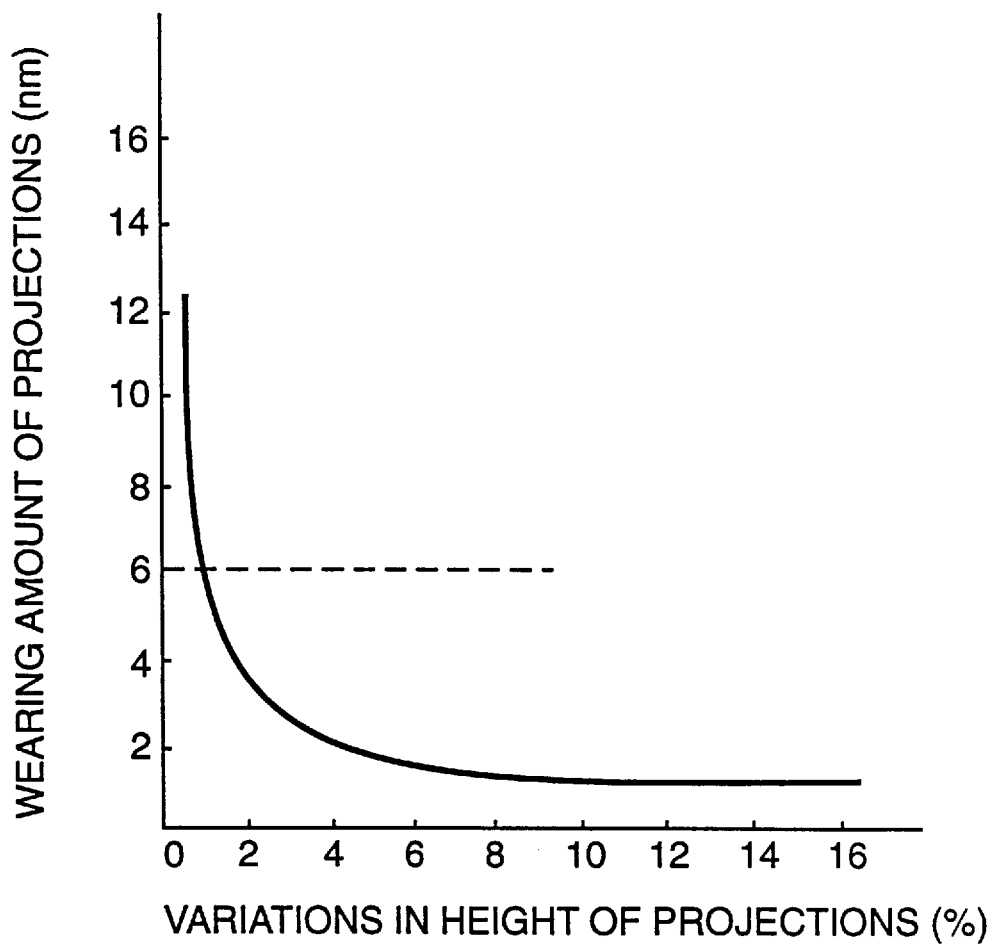
FIG. 13 is a graph showing a relationship between variation in the height of the projections and wear amounts of the projections after a seek test.
Figure 14A:
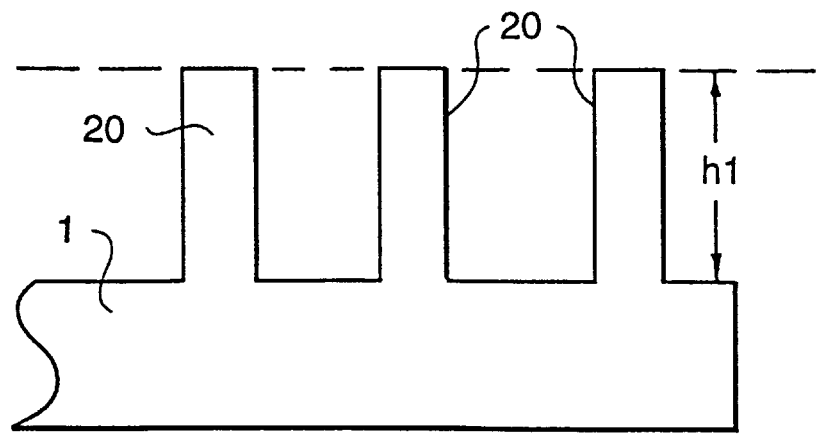
FIGS. 14(a) and 14(b) are views showing a method of measuring wear amounts of the projections after the seek test.
Figure 14B:
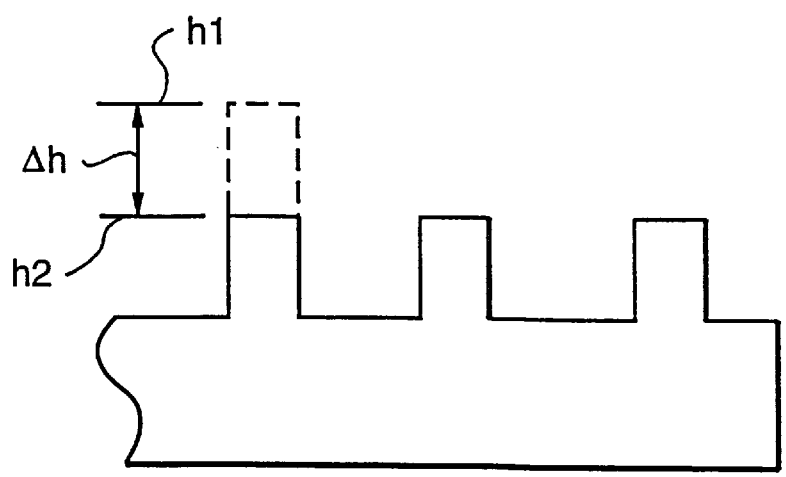

The gliding characteristic of the magnetic disks for Embodiments 1–3 and for the Comparative Embodiment are shown graphically in FIG. 12, wherein the acceptance ratio is plotted for each of the floating heights used in the gliding tests set forth in the foregoing discussion of these embodiments. A preferable floating characteristic is seen for the Embodiments 1–3, but not for the Comparative Embodiment.

According to the present invention, variations in the height of the projections on the surface of a protective film formed on a magnetic disk are specified to be in a range of ±1% to ±15%. This is effective to significantly improve the floating characteristic and to increase the acceptance ratio in a gliding test in a low floating area. The surface processing apparatus for simultaneously processing both sides of the magnetic disk is effective to fabricate a magnetic disk in which variations in the height of the projections on the surface of a protective film are in the range of ±1% to ±10% and thereby the floating characteristic is improved, particularly, in a low floating area.

While preferred embodiments have been set forth with specific details, further embodiments, modifications and variations are contemplated according to the broader aspects of the present invention, all as determined by the spirit and scope of the following claims.

We claim:

1. A surface processing apparatus for a magnetic disk, used for forming irregularities on a surface of a protective film of a magnetic disk including a non-magnetic disk substrate on which a magnetic recording film and said protective film are formed, comprising:

a first electrode for fixing said magnetic disk, said first electrode having an inside diameter larger than an inside diameter of said non-magnetic substrate;

surrounding said first electrode with a shield which has the equivalent electrical potential as the second electrode described below;

arranging a second electrode for generating plasma against the surface of said magnetic disk in such a manner as to be in parallel to the surface of said magnetic disk;

arranging a pair of peripheral rings whose electrical potential is floated or equivalent to the second electrode whose inner diameters are larger than said disk substrate for controlling plasma generated on the surface of said magnetic disk at a position separated from the outer edge of said magnetic disk by a specified distance symmetrically with respect to said magnetic disk; and wherein a power is applied between said first and second electrodes for plasma-etching the surface of said magnetic disk.

2. A surface processing apparatus for a magnetic disk according to claim 1, wherein a high frequency power is applied between said first and second electrodes for simultaneously plasma-etching both surfaces of said magnetic disk.

3. A surface processing apparatus for a magnetic disk according to claim 1, wherein when both surfaces of said protective film of said magnetic disk are simultaneously plasma-etched by applying a high frequency power between said first and second electrodes to provide variations in etching amounts that are in a range of ±1% to ±15%, at least in a recording/reproducing area.

4. A surface processing apparatus for a magnetic disk according to claim 1, wherein said first electrode has a shape for holding an inside diameter portion of said magnetic disk, and is covered with said shield excluding a contact surface with said magnetic disk.

5. A surface processing apparatus for a magnetic disk according to claim 1, wherein said shield covers 90% or less of a diameter of said first electrode.

6. A surface processing apparatus for a magnetic disk according to claim 1, wherein said shield covers 70% or less of a diameter of said first electrode.

7. A surface processing apparatus for a magnetic disk according to claim 1, wherein said plasma control member is disposed separately from said magnetic disk to be plasma-etched, by a distance being twice an outside diameter of said magnetic disk or less.

8. A surface processing apparatus for a magnetic disk according to claim 1, wherein said plasma control member is disposed separately from said magnetic disk to be plasma-etched, by a distance being 1.5 times an outside diameter of said magnetic disk or less.

9. A surface processing apparatus for a magnetic disk according to claim 1, further including means for adjusting a distance between said plasma control member and said magnetic disk to be plasma-etched.

10. A method of manufacturing a magnetic disk including a non-magnetic disk substrate on which a magnetic recording film and a protective film are formed, using an apparatus comprising:

first electrode for fixing said magnetic disk, said first electrode having an inside diameter larger than an inside diameter of said non-magnetic substrate;

an electrically grounded shield for shielding said first electrode;

a second electrode, disposed in parallel to the surface of said magnetic disk, for generating plasma directed against the surface of said magnetic disk; and a plasma control member, disposed at a position separated from an outer edge of said magnetic disk by a specified distance, for controlling the plasma directed against the surface of said magnetic disk, said method comprising the steps of:

forming a mask member on a surface of said protective film of said magnetic disk;

applying a power between said first and second electrodes of said surface processing apparatus for generating a uniform plasma; and uniformly plasma-etching the surface of said magnetic disk.

11. A method of manufacturing a magnetic disk according to claim 10, wherein the surface of said magnetic disk is plasma-etched using said surface processing apparatus while applying a high frequency power is applied between said first and second electrodes for simultaneously plasma-etching both surfaces of said magnetic disk.

12. A method of manufacturing a magnetic disk according to claim 10, further including simultaneously plasma-etching both surfaces of said protective film by applying a high frequency power between said first and second electrodes to provide variations in etching amounts that are in a range of ±1% to ±15%, at least in a recording/reproducing area on the surface of said magnetic disk.

13. A method of manufacturing a magnetic disk according to claim 10, wherein the surface processing apparatus for said magnetic disk further includes said first electrode having a shape for holding an inside diameter portion of said magnetic disk that is covered with said shield excluding a contact surface with said magnetic disk.

14. A method of manufacturing a magnetic disk according to claim 10, wherein the surface processing apparatus for said magnetic disk further includes said shield covering 90% or less of a diameter of said first electrode.

15. A method of manufacturing a magnetic disk according to claim 10, wherein the surface processing apparatus for said magnetic disk further includes said shield covering 70% or less of a diameter of said first electrode.

16. A method of manufacturing a magnetic disk according to claim 10, wherein the surface processing apparatus for said magnetic disk further includes said plasma control member being disposed separately from said magnetic disk to be plasma-etched, by a distance being twice an outside diameter of said magnetic disk or less.

17. A method of manufacturing a magnetic disk according to claim 10, wherein the surface processing apparatus for said magnetic disk further includes said plasma control member being disposed separately from said magnetic disk to be plasma-etched, by a distance being 1.5 times an outside diameter of said magnetic disk or less.

18. A method of manufacturing a magnetic disk according to claim 10, wherein the surface processing apparatus for said magnetic disk further includes means for adjusting a distance between said plasma control member and said magnetic disk to be plasma-etched.

* * * * *